(12) United States Patent
Park et al.

(10) Patent No.: US 12,555,612 B2
(45) Date of Patent: Feb. 17, 2026

(54) SYSTEM AND METHOD FOR TRANSMITTING AND RECEIVING VIDEO BASED ON WIRELESS TRANSMISSION

(71) Applicant: WISEJET INC., Daejeon (KR)

(72) Inventors: Chul Soon Park, Hanam-si (KR); Byeong Nam Ahn, Yongin-si (KR)

(73) Assignee: WISEJET INC., Daejeon (KR)

( * ) Notice: Subject to any disclaimer, the term of this patent is extended or adjusted under 35 U.S.C. 154(b) by 0 days.

(21) Appl. No.: 18/830,767

(22) Filed: Sep. 11, 2024

(65) Prior Publication Data

US 2026/0024556 A1     Jan. 22, 2026

(30) Foreign Application Priority Data

Jul. 16, 2024   (KR) ........................ 10-2024-0093423

(51) Int. Cl.
| | | |
|---|---|---|
| *G11B 27/36* | (2006.01) | |
| *G11B 27/34* | (2006.01) | |
| *H04N 21/44* | (2011.01) | |
| *H04N 21/442* | (2011.01) | |

(52) U.S. Cl.
CPC .............. *G11B 27/36* (2013.01); *G11B 27/34* (2013.01); *H04N 21/44008* (2013.01); *H04N 21/44209* (2013.01)

(58) Field of Classification Search
None
See application file for complete search history.

(56) References Cited

U.S. PATENT DOCUMENTS

| | | | |
|---|---|---|---|
| 10,856,039 B2 | 12/2020 | Oh et al. | |
| 11,367,169 B2 | 6/2022 | Chae | |
| 11,449,969 B2 | 9/2022 | Oh et al. | |
| 2003/0101386 A1* | 5/2003 | Brouet | H04L 1/007 714/704 |
| 2009/0313676 A1* | 12/2009 | Takeshima | H04L 65/80 725/119 |
| 2024/0031644 A1 | 1/2024 | Seo et al. | |
| 2024/0195516 A1 | 6/2024 | Kwon | |
| 2025/0047806 A1* | 2/2025 | Menini | G06T 5/70 |
| 2025/0173605 A1* | 5/2025 | Shang Guan | G06N 20/00 |

FOREIGN PATENT DOCUMENTS

| | | |
|---|---|---|
| KR | 10-2011-0075803 A | 7/2011 |
| KR | 10-2019-0054288 A | 5/2019 |
| KR | 10-2019-0088406 A | 7/2019 |
| KR | 10-2020-0052101 A | 5/2020 |
| KR | 10-2116410 B1 | 5/2020 |
| KR | 10-2330781 B1 | 11/2021 |
| KR | 10-2021-0146458 A | 12/2021 |
| KR | 10-2614216 B1 | 12/2023 |
| KR | 10-2024-0088521 A | 6/2024 |

OTHER PUBLICATIONS

Korea Office Action for KR10-2024-0093423 dated Sep. 2, 2024.

* cited by examiner

*Primary Examiner* — Hung Q Dang
(74) *Attorney, Agent, or Firm* — Sughrue Mion, PLLC

(57) ABSTRACT

A method for transmitting and receiving video based on wireless transmission includes: receiving video frames that are wirelessly transmitted from a transmission device using a predetermined frequency band; sensing an error of at least one video frame of the received video frames; and correcting the error of the error video frame with the sensed error (hereafter, error video frame) by inputting the error video frame into a pre-trained AI model together with a previous video frame.

14 Claims, 8 Drawing Sheets

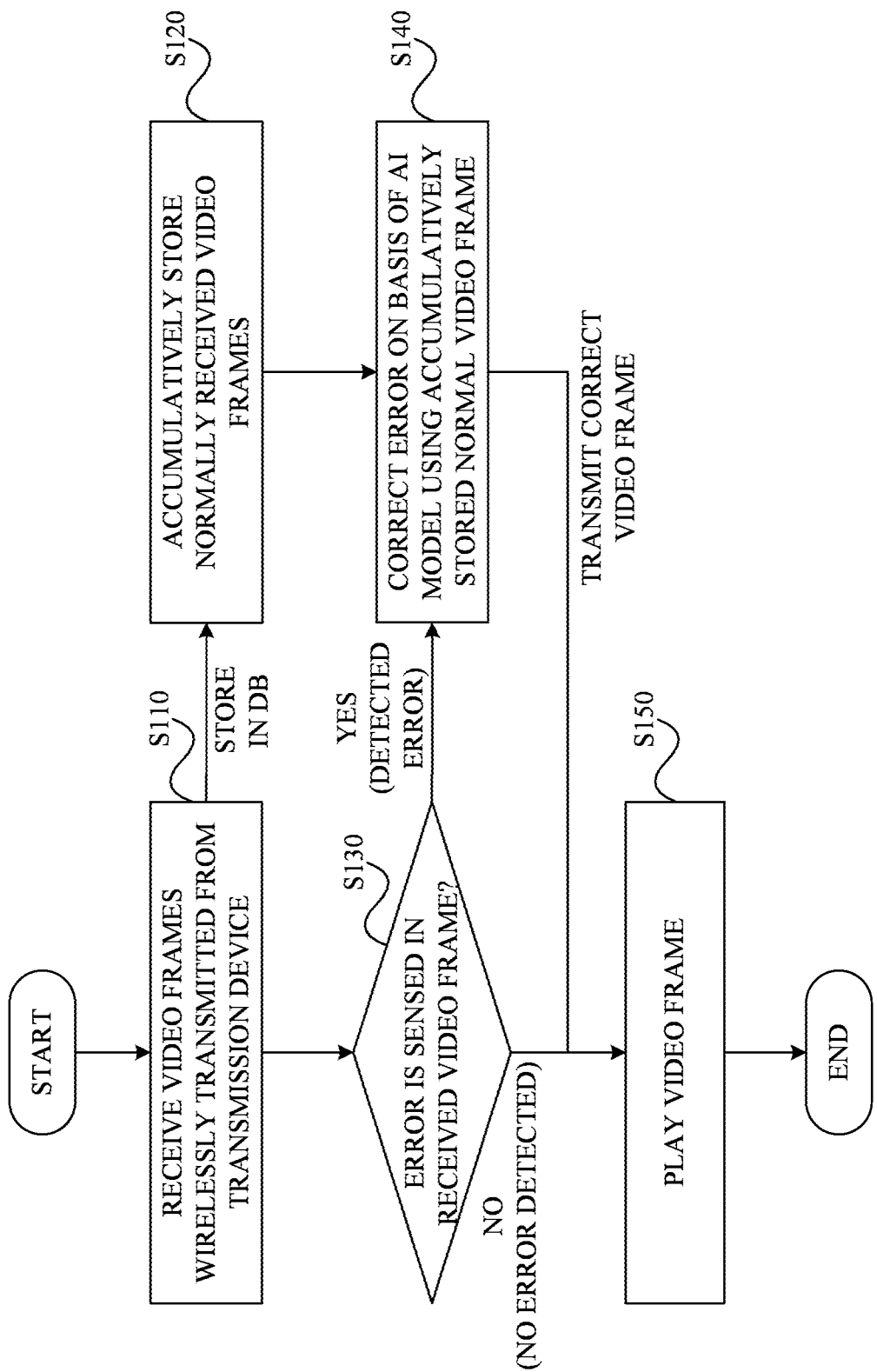

SYSTEM AND METHOD FOR TRANSMITTING AND RECEIVING VIDEO BASED ON WIRELESS TRANSMISSION

CROSS-REFERENCE TO RELATED APPLICATION

This application claims under 35 U.S.C. § 119(a) the benefit of Korean Patent Application No. 10-2024-0093423 filed on Jul. 16, 2024, the entire contents of which are incorporated herein by reference.

BACKGROUND

(a) Technical Field

The present disclosure relates to a system and method for transmitting and receiving video based on wireless transmission, and more specifically, to a system and method for transmitting and receiving video, the system and method being able to correct an error video frame generated in a wireless transmission process.

(b) BACKGROUND ART

Smart glasses or AR glasses (hereafter, smart glasses) are devices that enable a user to interact with the surroundings while providing the user with digital information in real time. Such devices, in general, take video through a built-in camera and wirelessly transmit the taken video to process or display the taken video in other devices such as a smart phone or a smart watch.

Most of wearable devices such as smart glasses transmit data using a wireless communication method to maximize mobility and convenience. In particular, wireless communication of 60 GHz frequency band enables high-speed data transmission, so it is suitable for real-time video streaming. However, wireless communication of 60 GHz band provides a high frequency bandwidth, but has a drawback of strong signal directivity and large signal attenuation due to obstacles. Accordingly, there is a high possibility of errors in transmitted data due to signal attenuation in a Non-Line-of-Sight (non-LoS) environment. In this case, it is difficult to correct errors using only the conventional channel coding technique, and particularly, in the case of severe data loss or distortion, there is a limitation in restoring the original frame.

Meanwhile, smart glasses take video in accordance with the Field of View (FOV) of a user. The current frame video of smart glasses corresponds to simple variation of FOV when a user turns his/her face or moves from the past frame or variation of position information of an object with variation of FOV in most case.

However, there are limitations in restoring a frame with a large error using only an existing channel coding technique. In particular, when a severe error is generated, it may be required to discard the entire frame. In this case, there is a need for a method of restoring a frame or correcting an error by applying an AI-based algorithm rather than discarding the frame.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An embodiment of the present disclosure provides a method for transmitting and receiving video based on wireless transmission, the method improving the quality of video and enabling a user to experience high-quality video by correcting errors, which are generated when video is transmitted from a source device using a wireless frequency band, in real time using an AI-based algorithm.

However, the objects to be achieved by embodiments of the present disclosure are not limited to the objects described above and there may be other objectives.

As a technical means for achieving the objects described above, a method for transmitting and receiving video based on wireless transmission in a reception device according to a first aspect of the present disclosure includes: receiving video frames that are wirelessly transmitted from a transmission device using a predetermined frequency band; sensing an error of at least one video frame of the received video frames; and correcting the error of the video frame with the sensed error (hereafter, error video frame) by inputting the error video frame into a pre-trained AI model together with a previous video frame.

Further, a reception device according to a second aspect of the present disclosure includes: a communication module receiving video frames that are wirelessly transmitted from a transmission device using a predetermined frequency band; a memory storing a program for sensing and correcting an error of at least one video frame of the received video frames; and a processor correcting the error of the video frame with the sensed error (hereafter, error video frame) by inputting the error video frame into a pre-trained AI model together with a previous video frame as the program stored in the memory is executed.

In addition, other methods and other systems for implementing the present disclosure, and computer-readable recording media recording a computer program for executing the methods may be further provided.

According to an embodiment of the present disclosure described above, an error of video frames that are wirelessly transmitted are precisely sensed and corrected, an object and a background are discriminated through an AI model, and an error generation region is automatically corrected and then provided, so the reception device can provide a user with natural video and video streaming through corrected video frames even though a problem is temporarily generated in a network.

The effects of the present disclosure are not limited to those described above and other effects not mentioned will be apparently understood to those skilled in the art from the description below.

BRIEF DESCRIPTION OF DRAWINGS

FIG. 4 is a flowchart of a method for transmitting and receiving video based on wireless transmission according to an embodiment of the present disclosure.

DETAILED DESCRIPTION

Figure 1:
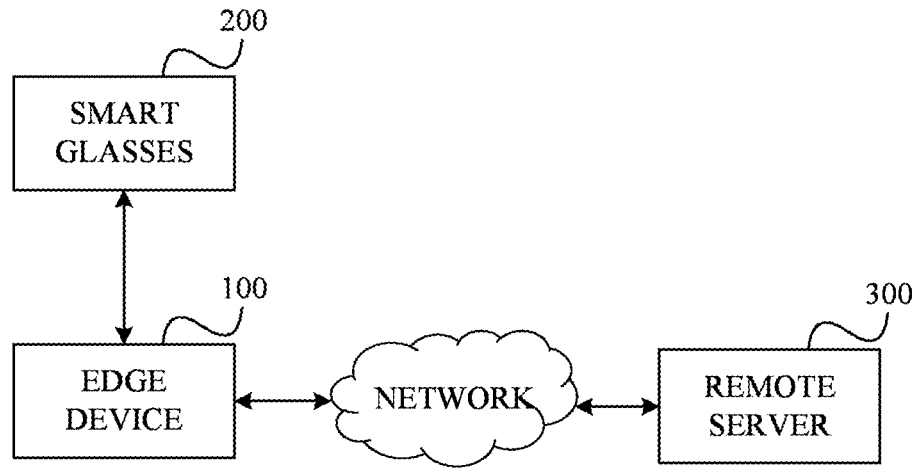
FIG. 1 is a diagram schematically showing a system for transmitting and receiving video based on wireless transmission according to an embodiment of the present disclosure.

The advantages and features of the present disclosure, and methods of achieving them will be clear by referring to the exemplary embodiments that will be described hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined only by the scope of the claims.

The terms used herein are provided to describe embodiments without limiting the present disclosure. In the present specification, a singular form includes a plural form unless specifically stated in the sentences. The terms "comprise" and/or "comprising" used herein do not exclude that another component exists or is added other than the stated component. Throughout the specification, the same reference numerals indicate the same components, and the term "and/or" includes each of the stated components and all of one or more combinations. Although terms "first", "second", etc. are used to describe various components, it should be noted that these components are not limited by the terms. These terms are used only for discriminating a component from another component. Accordingly, it should be noted that a first component that is stated below may also be a second component within the technical spirit of the present disclosure.

Unless defined otherwise, all terms (including technological and scientific terminologies) used herein may be used as meanings that those skilled in the art can commonly understand. Further, terms defined in common dictionaries are not construed ideally or excessively unless specifically and clearly defined.

Hereafter, a device and method for transmitting and receiving video based on wireless transmission according to an embodiment of the present disclosure is described in detail with reference to the accompanying drawings.

FIG. 1 is a diagram schematically showing a system 1 for transmitting and receiving video based on wireless transmission according to an embodiment of the present disclosure.

As shown in FIG. 1, the system 1 for transmitting and receiving video based on wireless transmission according to the present disclosure includes a transmission device, a reception device, and a remote server 300.

In this case, the components constituting the system 1 for transmitting and receiving video based on wireless transmission shown in FIG. 1 can be connected through a network. The network means a connection structure enabling information exchange between respective nodes such as terminals and servers. For example, the network includes a 3GPP (3rd Generation Partnership Project) network, an LTE (Long Term Evolution) network, a 5G network, a WIMAX (World Interoperability for Microwave Access) network, an Internet, a LAN (Local Area Network), a Wireless LAN (Wireless Local Area Network), a WAN (Wide Area Network), a PAN (Personal Area Network), a Bluetooth network, a satellite broadcasting network, an analogue broadcasting network, a DMB (Digital Multimedia Broadcasting) network, WiFi, etc., but is not necessarily limited thereto.

In an embodiment of the present disclosure, the transmission device is an object that transmits video and the reception device is an object that receives video. For example, the transmission device may be smart glasses 200 and the reception device may be an edge device 100, but they are not limited thereto. The transmission device may be not only the smart glasses 200, but also any device including an HMD and other cameras and displays. Hereafter, the smart glasses 200 and the edge device 100 are exemplified in the description of the present disclosure.

Meanwhile, in the description of the present disclosure, a device may be a transmission device when the device transmits video, and a device may be a reception device when the device receives video, depending on the time points of transmission and reception. That is, transmission and reception devices are not limited to any specific device.

As an embodiment, a transmission device can transmit video taken through a camera to a reception device. In the above example, it is possible to transmit video taken through a camera included in the smart glasses 200 to a reception device.

As another embodiment, a transmission device may transmit video stored or received from the outside to a reception device. In the above example, the edge device 100 may transmit video stored in a memory or video received through the Internet, etc. to the smart glasses 200, and the smart glasses 200 may output the transmitted video.

In this case, the edge device 100 is an intelligent terminal obtained by adding computer support functions, such as Internet communication and information search, to a mobile terminal and may be a mobile phone, a smart phone, a pad, a smart watch, a wearable device, other mobile communication terminals, etc. in which a user can install and executes multiple desired application programs (i.e., applications). Further, the edge device 100 may be implemented as a computer that can be connected through a network. In this case, the computer, for example, may include a notebook, a desktop, a laptop, etc. equipped with a web browser.

The remote server 300 transmits/receives data to/from the edge device 100 when the transmission device or the reception device is the edge device 100. In detail, when the edge device 100 has difficulty in restoring an error video frame, the remote server 300 receives the error video frame, and generates and provides a corrected video frame to the edge device 100. This is because there is a problem that, considering the resources of the edge device 100, it is possible to correct a small number of error video frames but video play delay increases when multiple error video frames over a predetermined number are corrected, so, in this case, it is preferable to correct error video frames in the remote server 300.

Meanwhile, a predetermined frequency band is used to wireless transmission in the present disclosure, and, as an embodiment, it is possible to wirelessly transmit video using a 60 GHz frequency band. When transmitting video using a 60 GHz radio frequency band, it is possible to transmit video at a very high data transmission speed with low delay time. However, the 60 GHz radio frequency band has strong Line-of-Sight (LoS), so, in a non-LoS environment, signal attenuation occurs and the possibility of errors in transmitted data is high. It is possible to exemplify a non-LoS environment as a network environment condition in which an error is generated in a video frame in the description of the present disclosure, but the present disclosure is not necessarily limited thereto.

Embodiments of the system 1 for transmitting and receiving video based on wireless transmission according to the present disclosure are described with reference to FIGS. 2A to 2D.

First Embodiment

Figure 2A:
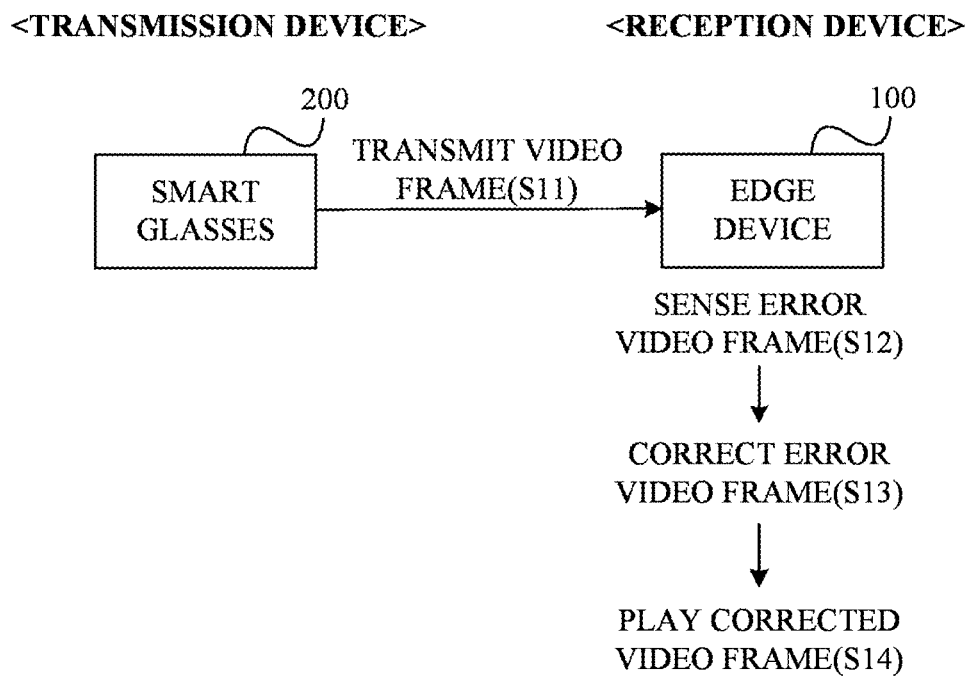
FIG. 2A is a diagram illustrating a system for transmitting and receiving video based on wireless transmission according to a first embodiment of the present disclosure.
Figure 2B:
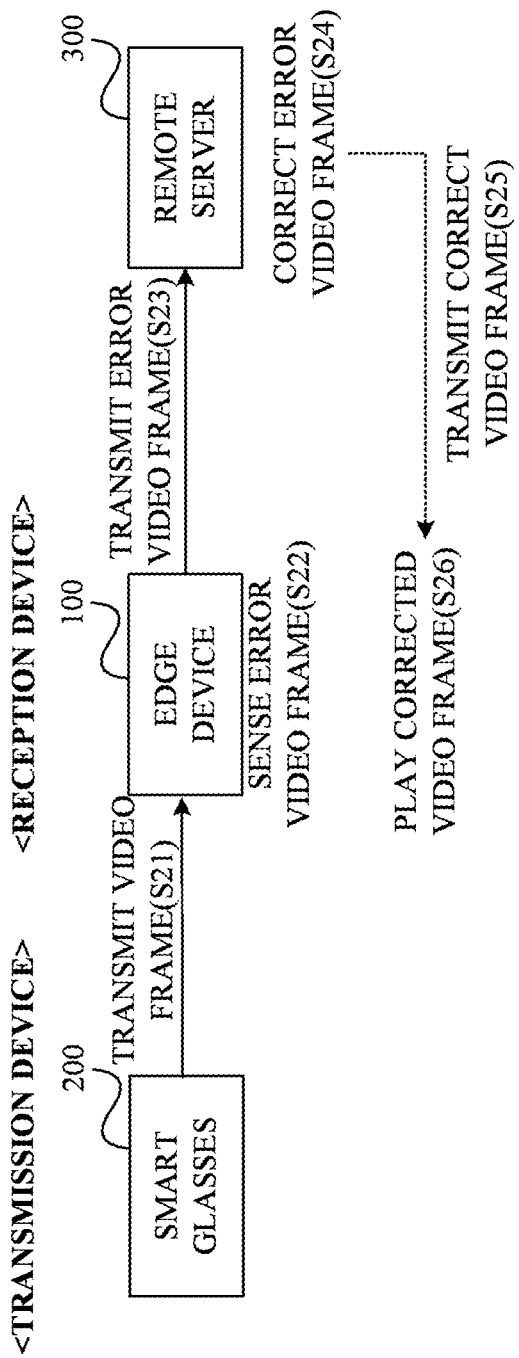
FIG. 2B is a diagram illustrating a system for transmitting and receiving video based on wireless transmission according to a second embodiment of the present disclosure.

FIG. 2A is a diagram illustrating a system 1 for transmitting and receiving video based on wireless transmission according to a first embodiment of the present disclosure.

The first embodiment of the present disclosure is the case when a transmission device is the smart glasses 200 and a reception device is the edge device 100.

When a user activates a camera with the smart glasses 200 on, surrounding videos of the user taken by the camera are wirelessly transmitted to the edge device 100 (S11). In this case, when an error is generated in a transmitted video frame due to a poor network environment between the transmission device and the reception device, the reception device may sense the error video frame (S12), and can correct and then play the sensed error video frame (S13, S14). Accordingly, the user may be continuously provided with corrected video frames of error video frames and may watch video without disconnection.

Second Embodiment

FIG. 2A is a diagram illustrating a system 1 for transmitting and receiving video based on wireless transmission according to a second embodiment of the present disclosure.

The second embodiment of the present disclosure is the case when a transmission device is the smart glasses 200 and a reception device is the edge device 100, same as the first embodiment, and the remote server 300 additionally intervenes.

When a user activates a camera with the smart glasses 200 on, surrounding videos of the user taken by the camera are wirelessly transmitted to the edge device 100 (S21). In this case, when an error is generated in a transmitted video frame, the reception device may sense the error video frame (S22). Further, when the reception device has difficulty in correcting all of error video frames using its resource, the reception device may transmit the error video frames to the remote server 300 (S23). Depending on embodiments, the reception device may transmit error video frames one by one or in multiple batches to the remote server 300, and, as correction is completed, the remote server 300 may transmit corrected video frames one by one or in multiple batches to the reception device.

The remote server 300 may correct and then transmit the received error video frames to the reception device (S24, S25) and the reception device may play the corrected video frames (S26). As such, even though a large amount of error video frames are generated, it is possible to continuously provide video to a user by correcting the error video frames in real time through the remote server 300.

Third Embodiment

Figure 2C:
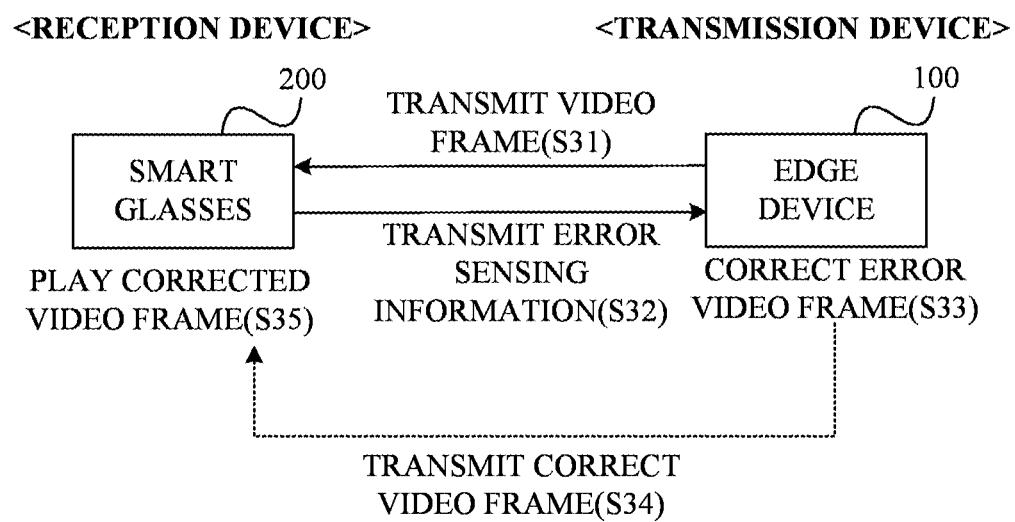
FIG. 2C is a diagram illustrating a system for transmitting and receiving video based on wireless transmission according to a third embodiment of the present disclosure.

FIG. 2C is a diagram illustrating a system 1 for transmitting and receiving video based on wireless transmission according to a third embodiment of the present disclosure.

The third embodiment of the present disclosure, opposite to the first embodiment, is the case when a transmission device is the edge device 100 and a reception device is the smart glasses 200.

A user may wirelessly receive video from the edge device 100 with the smart glasses 200 on (S31), and can play received video through a display mode of the smart glasses 200. In this case, when an error video frame is generated due to a poor network environment, the smart glasses 200 can transmit error sensing information to the edge device 100 (S32). Further, the smart glass 200 stops video playback until receiving a corrected video frame.

The edge device 100 corrects and transmits an error video frame corresponding to the error sensing information to the smart glasses 200 (S33, S34), and the smart glasses 200 may provide continuous video to the user by playing the corrected video frame (S35).

In this case, when there is a plurality of error video frames, the smart glasses 200 may sequentially transmit error sensing information corresponding to the error video frames, and the edge device 100 may sequentially provide corrected video frames of the error video frames to the edge device 100.

Fourth Embodiment

Figure 2D:
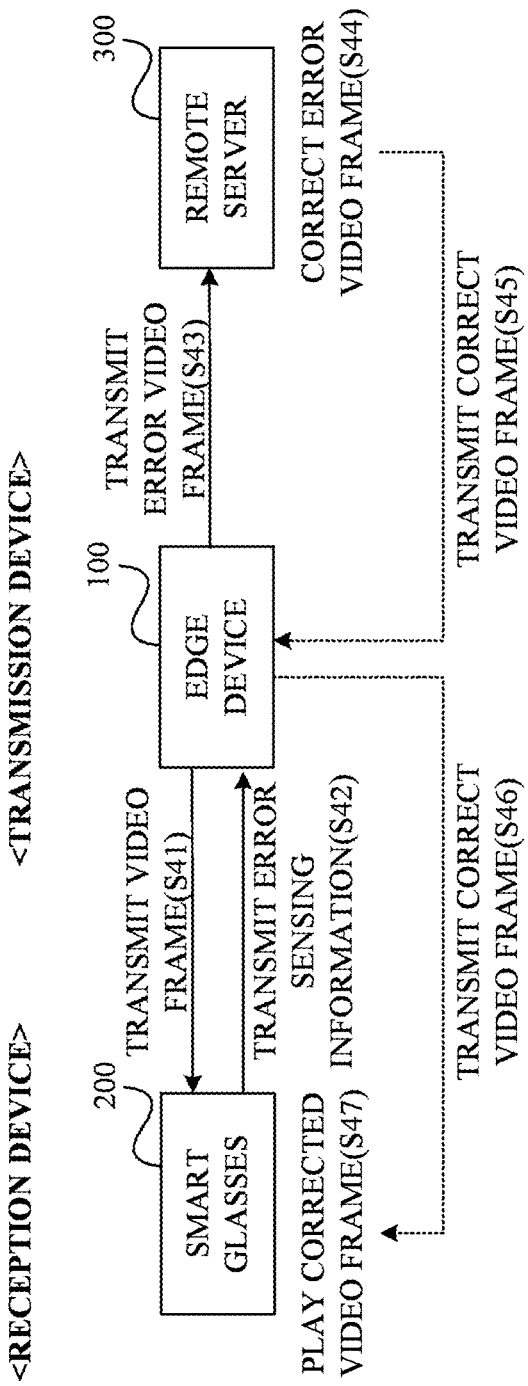
FIG. 2D is a diagram illustrating a system for transmitting and receiving video based on wireless transmission according to a fourth embodiment of the present disclosure.

FIG. 2D is a diagram illustrating a system 1 for transmitting and receiving video based on wireless transmission according to a fourth embodiment of the present disclosure.

The fourth embodiment of the present disclosure is the case when a transmission device is the edge device 100 and a reception device is the smart glasses 200, same as the second embodiment, and the remote server 300 additionally intervenes.

A user can watch video by wirelessly receiving video from the edge device 100 with the smart glasses 200 on (S41). In this case, when an error video frame is generated, the smart glasses 200 may transmit error sensing information to the edge device 100 (S42).

The edge device 100 receiving the error sensing information may generate and transmit corrected video frames to the smart glasses 200 through sequential correction, similar to the third embodiment. In this process, when the number of error video frames is greater than or equal to a preset number by continuously receiving error sensing information for correction, the edge device 100 may transmit error sensing information or error video frames corresponding to the error sensing information to the remote server 300 (S43).

The remote server 300 corrects and transmits error video frames corresponding to the error sensing information to the edge device 100 (S44, S45), the edge device 100 transmits the corrected error video frames to the smart glasses 200, and the smart glasses 200 may play the corrected video frames (S46, S47).

Hereafter, the configuration of each component of the system 1 for transmitting and receiving video based on wireless transmission according to an embodiment of the present disclosure is described with reference to FIGS. 3A to 3D. In this case, the smart glasses 200, the edge device 100, and the remote server 300 are exemplified in the description of the present disclosure. Further, only the configuration related to wireless transmission and error correction that are addressed in the present disclosure is shown and described, and it is assumed that other configurations that are necessarily included in respective terminals and devices can be naturally provided. For example, it is possible to assume that the smart glasses 20 naturally has a camera.

Figure 3A:
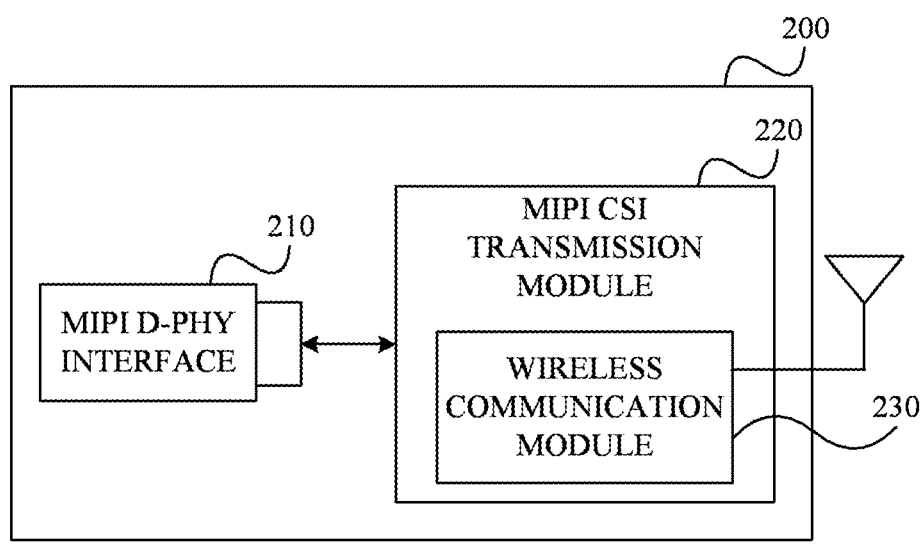
FIG. 3A is a block diagram of smart glasses according to an embodiment of the present disclosure.

FIG. 3A is a block diagram of the smart glasses 200 according to an embodiment of the present disclosure.

As an embodiment, the smart glasses 200 may include a Mobile Industry Processor Interface Camera Serial Interface (MIPI D-PHY interface) 210, an MIPI CSI transmission module 220, and a wireless communication module 230.

The MIPI D-PHY interface 210 and the MIPI CSI transmission module 220 enables high-speed data transmission by observing standards defined by MIPI Alliance, and receive video data taken by a camera module (not shown) mounted on the smart glasses 200 and transfer the video data to a processor (not shown) of the smart glasses 200.

When receiving video from the MIPI CSI transmission module 220, the processor processes video and then transmits the video to the wireless communication module 230. For example, the processor may perform processing such as simple video processing or compression conversion for video transmission.

The wireless communication module 230 may wirelessly transmit video data received through the processor using a predetermined frequency band.

Figure 3B:
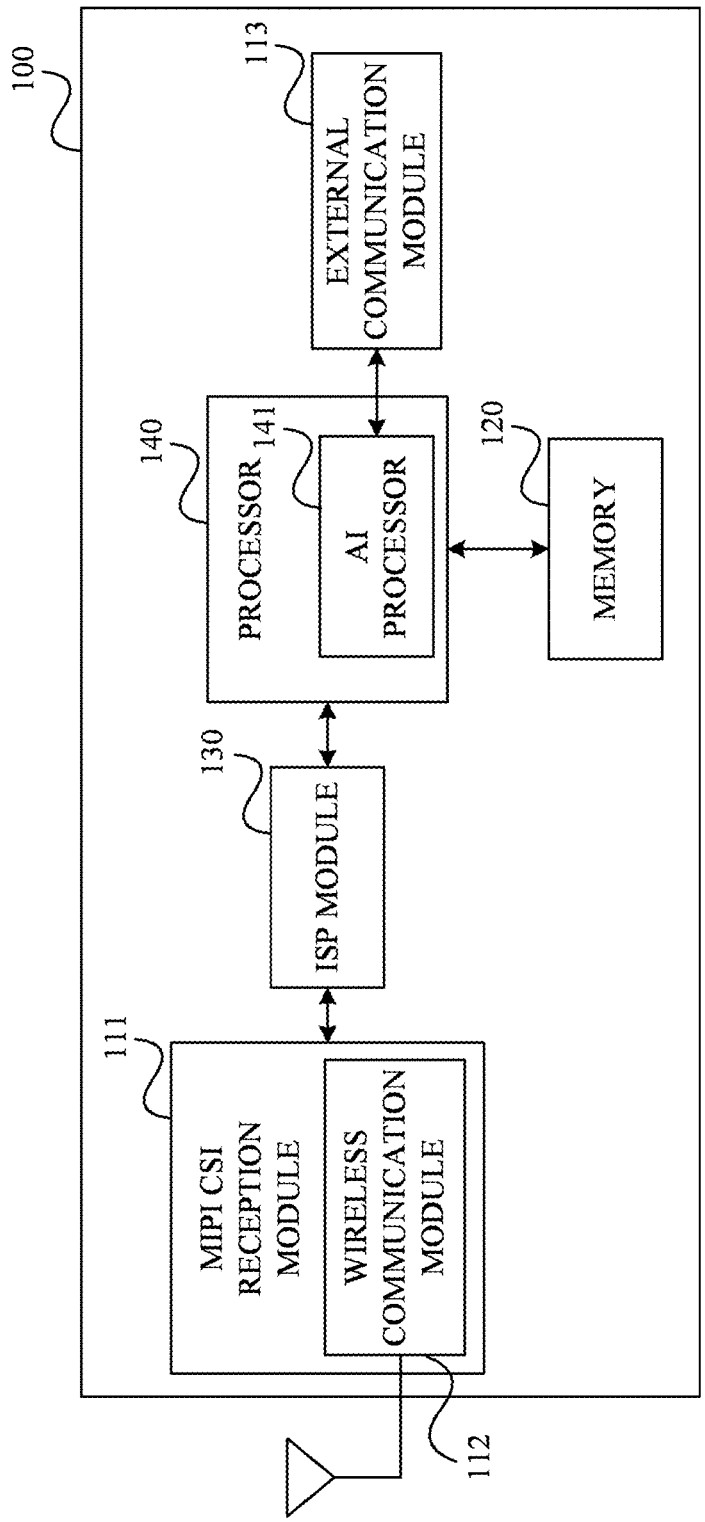
FIG. 3B is a block diagram of an edge device according to an embodiment of the present disclosure.

FIG. 3B is a block diagram of an edge device 100 according to an embodiment of the present disclosure.

As an embodiment, the edge device 100 may include a communication module (not shown), a memory 120, an ISP module 130, and a processor 140. In this case, the communication module may include an MIPI CSI reception module 111, a wireless communication module 112, and an external communication module 113. Further, the processor 140 may be implemented in the type equipped with a program that performs the function of an AI processor 141 or may be implemented in the type separately equipped with a common processor 140 and an AI processor 141 that performs only the function related to an AI model.

The wireless communication module 112 receives a video frame transmitted from the smart glasses 200. As an embodiment, the wireless communication module 112 may be a module to which a radio frequency of a 60 GHz band is applied.

The MIPI CSI reception module 111 may transmit a video frame received through the wireless communication module 112 to the processor 140, or, if necessary, to an Image Signal Process (ISP) module.

The IPS module 130 processes a predetermined data of received image data, and for example, may perform image processing such as noise reduction, color correction, white balance adjustment, etc.

The external communication module 113 transmits and receives data to and from the remote server 300. The external communication module 113 can transmit and receive data by applying a predetermined wireless communication method to the external communication module 113. For example, as the predetermined wireless communication method, wireless LAN (WLAN), Bluetooth, HDR WPAN, UWB, ZigBee, Impulse Radio, 60 GHz WPAN, Binary-CDMA, a wireless USB technique and a wireless HDMI technique, and other 5G (5th generation communication), 6G (6th generation communication), long term evolution-advanced (LTE-A), long term evolution (LTE), Wi-Fi (wireless fidelity), etc. may be applied. However, the external communication module 113 is not necessarily limited to a wireless communication method and wired communication methods may also be applied. As an example of wired communication methods, a power line communication device, a telephone line communication device, a cable home (MoCA), Ethernet, IEEE1294, an integrated wire home network, an RS-485 controller, etc. may be applied.

A program for processing video frames and sensing and correcting error video frames is stored in the memory 120, and particularly, a program for training and operating an AI model applied to correct error video frames is stored. In this case, the memory 120 generally means a nonvolatile storage device and a volatile storage device that keep stored information even though power is not supplied. For example, the memory 120 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as a CD-ROM and s DVD-ROM.

The processor 140 may control at least one other component (e.g., a hardware or software component) of the edge device 100 by performing a program and software stored in the memory 120, and can performs various types of data processing and computing. As described above, in accordance with an embodiment, the processor 140 may be implemented by separated common processor 140 and AI processor 142, and the type in which they are integrated is described hereafter.

In this case, in an embodiment of the present disclosure, in order to generate an AI algorithm, the processor 140 may use at least one of machine learning, a neural network, or a deep learning algorithm as an AI model, and as examples of the neural network, models such as a Convolutional Neural Network (CNN), a Deep Neural Network (DNN), and a Recurrent Neural Network (RNN) may be included.

Further, in an embodiment of the present disclosure, an AI model may include generation models such as a Generative Adversarial Network (GAN) model and a diffusion model.

For example, when the AI model is a GAN model, a generator and a discriminator can correct error frames with competitive learning. In detail, a generator may receive an error frame and generate a corrected video frame. Further, a discriminator determines whether a corrected video frame is a substantially normal video frame or a video frame generated through correction. Thereafter, the generator generates a video frame corrected such that the discriminator cannot discriminate it, and the discriminator operates to discriminate well the corrected video frame generated by the generator, and, as a result, it is possible to achieve more delicate error correction.

As another example, when an AI model is a diffusion model, as the diffusion model receives a normal video frame as training data, the diffusion model may be trained by gradually adding noises (errors) to the normal video frame (forward process) and then removing or correcting the noises. Thereafter, when receiving an error video frame in an actual wireless transmission process, the trained diffusion model may output a corrected video frame by removing or correcting corresponding errors.

Figure 3C:
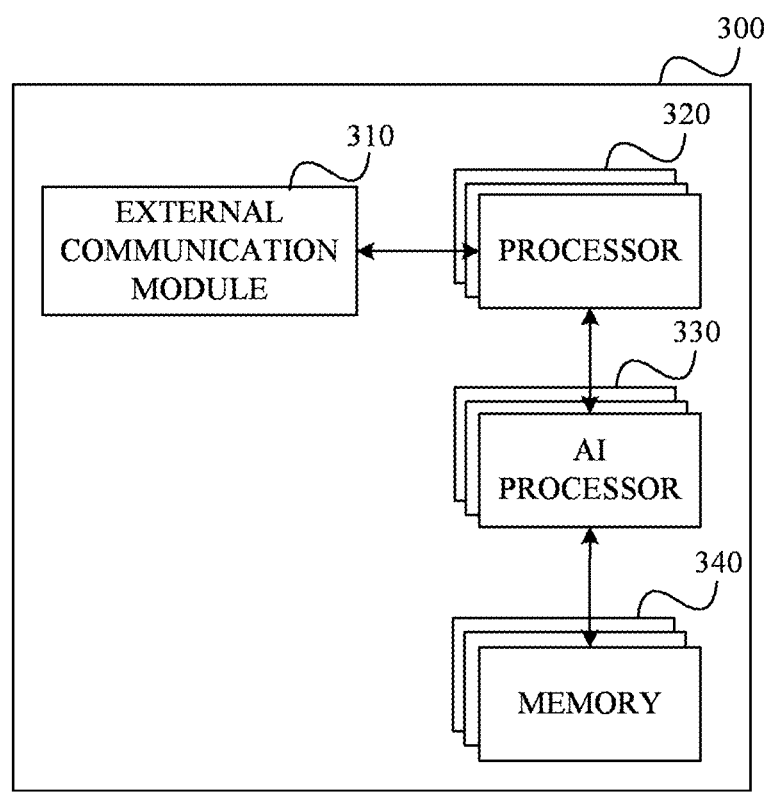
FIG. 3C is a block diagram of a remote server according to an embodiment of the present disclosure.

FIG. 3C is a block diagram of the remote server 300 according to an embodiment of the present disclosure.

As an embodiment, the remote server 300 may include an external communication module 310, processors 320 and 330, and a memory 340. In this case, the processor 320, similar to the edge device 100, may be implemented in the type equipped with a program that performs the function of an AI processor 330 or may be implemented in the type separately equipped with a common processor 320 and an AI processor 330 that performs only the function related to an AI model.

The configurations of the external communication module 310, the processor 320, the AI processor 330, and the memory 340 are the same as those described in relation with the edge device 100, but the remote server 300 may be a high-performance device having more resources than the edge device 100. That is, the remote server 300 may include a plurality of processors 320, AI processors 330, and memories 340, respectively.

Hereafter, a method that is performed by the system 1 for transmitting and receiving video based on wireless transmission according to an embodiment of the present disclosure is described with reference to FIG. 4.

FIG. 4 is a flowchart of a method for transmitting and receiving video based on wireless transmission according to an embodiment of the present disclosure. The first embodiment of the embodiments described above is exemplified in the following description, but the present disclosure is not necessarily limited thereto.

First, the reception device receives video frames that are wirelessly transmitted using a predetermined frequency band from the transmission device (S110). For example, video frames taken through the camera of the smart glasses 200 are wirelessly transmitted to the edge device 100 using a frequency band of 60 GHz.

The reception device may accumulatively store video frames normally received from the transmission device on a database (S120). This is for using in error correction later when an error is generated in a video frame transmitted from the transmission device.

Next, the reception device senses an error in at least one video frame of the received video frames (S130).

For example, the reception device monitors a bit error rate of a network environment for wireless transmission and may consider a received video frame as being normal when the bit error rate is a preset threshold value or less.

On the other hand, when sensing that the bit error rate exceeds the preset threshold value, the reception device may sense it as an error in the video frame. That is, when the bit error rate exceeds the threshold value in the process of monitoring, the reception device may determine that there is a problem with the network state or there is a problem in transmitted data. Further, it is possible to sense a corresponding frame as an error video frame by determining that the state exceeding the corresponding bit error rate influenced a specific frame.

Next, the reception device may correct the error of an error video frame by inputting a video frame with a sensed error into a pre-trained AI model together with previous video frames, that is, the normal video frames accumulatively stored in the database in step S120 (S140).

Next, the reception device plays the corrected video frame when error correction is completed (S150). Alternatively, the reception device may continuously play received video frames when an error is not sensed in step S130.

In relation to error correction, in detail, the reception device may generate an error generation region in an error video frame as lost information by inputting the error video frame into the AI model.

For example, the AI model of the reception device may sense abnormal values by receiving an error video frame and analyzing pixel values. Further, when a specific pixel value and pixel values around the specific pixel values are greater than or equal to a predetermined value or when abnormal colors such as white, black, or a specific color exist in a predetermined range or more, the region can be determined as an error generation region. In this case, the region including the specific pixel value may be determined as an error generation region when abnormal pixels greater than or equal to a predetermined number exist or when abnormal pixels greater than or equal to a predetermined number are adjacent to each other or are gathered.

In this case, the AI model can be trained in advance on the basis of a training dataset composed of error video frames including various error types and normal video frames. A binary mask for an error generation region may be set for error video frames constituting the training dataset. The AI model trained on the basis of the training dataset may sense a normal video frame or an error video frame by receiving an input of a video frame, and may specify an error generation region in the error video frame to provide the error generation region as an output result. Meanwhile, it should be noted that various techniques may be applied to a data preprocessing process such as labeling, removing of noise, and augmenting of data when configuring a training dataset.

Further, the AI model may collect log information for each of a normal video frame, an error video frame, and a corrected video frame for a predetermined unit period (time), and whether to retrain the AI model may be determined on the basis of respective log information. The reception device may apply the currently trained AI model to the next unit period as it is without retraining the AI model when a correction ratio calculated between an error video frame and a corrected video frame satisfies a minimum correction ratio or more. On the other hand, the reception device may retrain the AI model and then apply the AI model for the next unit period when the calculated correction ratio is less than the minimum correction ratio.

In this case, the minimum correction ratio may be the ratio between an error video frame and a corrected video frame obtained from the error video frame at a frame speed less than a preset frame speed, and the preset frame speed, for example, may be set to be less than 24 fps at which people start to feel disconnection of video. Accordingly, when the correction ratio is less than the minimum correction ratio, the reception device determines that the current correction performance is not sufficient, and can improve the correction performance by retraining the AI model by adding video data collected for a unit period to the training dataset or by changing hyper parameters etc.

As another example, the reception device may determine an error generation region by comparing a previous video frame and a current error video frame. For this purpose, the reception device divides each video frame into a plurality of blocks, and when each block has a difference exceeding a predetermined range in position and color of pixels from the previous video frame, the reception device may determine the block as an error generation region.

Next, the reception device may generate correction information from a region corresponding to lost information in the previous video frame as output of the AI model by inputting the lost information and the previous video frame into the AI model, and correct the region corresponding to the lost information in an error video frame on the basis of the correction information.

As an embodiment, the AI model may identify an object region and a background region that correspond to lost information in a plurality of previous video frames, and may generate position information of each of the identified object region and background region and the amount of variation of the position information as correction information. That is, when receiving an input of a plurality of previous video frames and lost information, the AI model may analyze the position information of an object and a background in the previous video frames and calculate the amount of variation of the positions of the object and the background between frames. In this case, the position information may be coordinate information of pixels constituting an object or a background, and the amount of variation of position information shows the degree of movement between frames.

Thereafter, the AI model corrects the region corresponding to the lost information of the error video frame on the basis of the correction information, so the corrected video frame may be normally played in the reception device.

In this case, when there are a large amount of lost pixels, it may be impossible to calculate accurate position information and the amount of variation of the position information, so, in this case, when the reception device identifies an object region and a background region, respectively, the reception device may predict movement pattern information of the object region on the basis of the previous video frames, and estimate the amount of variation of the position information of the object region on the basis of the movement pattern information. Further, the reception device may enable more accurate estimation by applying relationship information with a background region when predicting movement pattern information of an object.

Further from the above embodiment, not only one error video frame, but also a plurality of error video frames may be generated in wireless transmission. As described above, when the reception device receives a plurality of error video frames, the reception device may identify an object region and a background region that correspond to lost information in a previous video frame received before the plurality of error video frames, and a current video frame received after the plurality of error video frames, respectively. Further, it is possible to generate the position information of each of the object region and the background region in the previous video frame and the current video frame, and the amount of variation of the position information, as correction information.

Meanwhile, as another embodiment of correcting an error of an error video frame, when a reception device senses that the bit error rate described above exceeds a threshold value, the reception device may request a transmission device to temporarily store a plurality of video frames from the point in time at which an error was sensed.

Then, the reception device requests the transmission device to transmit the plurality of temporarily stored video frames and a current video frame at the point in time at which the bit error rate becomes less than or equal to the preset threshold value. For this purpose, the reception device may continuously monitor the bit error rate, and when the bit error rate becomes less than or equal to the preset threshold value, the reception device may determine that the network state has been normalized, and at this point in time, may request the temporarily stored video frames and the current video frame from the transmission device.

Next, the reception device may sequentially play the plurality of temporarily stored video frames and the current video frame. An error video frame having an error of the video frames received in this process may be corrected in accordance with the correction process described above, and accordingly, smooth video may be provided to a user.

Further, in an embodiment of the present disclosure, when error video frames are continuously generated, the reception device may correct a later error video frame on the basis of the information of a previous error video frame. In detail, when the correction of a first error video frame is completed, the reception device calculates similarity of lost information by comparing the lost information of the first and a second error video frames, respectively, when correcting the second error video frame which is generated after the first error video frame, in more detail, is generated continuously from the first error video frame. Further, when the calculated similarity of lost information is greater than or equal to a preset threshold value, it is possible to apply the correction information of the first error video frame as it is.

In this case, the similarity of lost information may be calculated by expressing each lost information as a vector and calculating the Euclid distance between the vectors, or may be calculated by calculating the mean square error and the means absolute error for the difference between respective pixels of the first and second error video frames.

On the other hand, when the similarity of lost information is less than the preset threshold value, the reception device may discriminate the coincident part and the non-coincident part of error generation regions included in respective lost information, apply first correction information of the first error video frame as correction information of the second error video frame for the coincident part, and generate and apply the first correction information as second correction information of the second error video frame for the non-coincident part. Accordingly, a portion of the first correction information and the second correction information may be applied as the correction information of the second error video frame.

As another embodiment, when the similarity of lost information is less than the preset threshold value, the reception device may correct the second error video frame on the basis of the ratio of an object region and a background region in lost information. In this case, when the lost information is composed of only a background region, the reception device may apply the first correction information as it is when correcting the second error video frame. Further, when the lost information is composed of only an object region, the reception device may apply a portion of the first correction information and the second correction information, as described above, when correcting the second error video frame.

Further, when the lost information is composed of a combination of an object region and a background region, the reception device may determine and apply the application ratio of the first correction information and the generation ratio of the second correction information on the basis of the ratio between the object region and the background region in the lost information when correcting the second error video frame. For example, when the ratio of a background region is relatively high, it is possible to correspondingly increase the application ratio of the first correction information, and when the ratio of an object region is relatively high, it is possible to correspondingly increase the generation and application ratios of the second correction information.

Meanwhile, steps S11 to S130 in the above description may be further divided into additional steps or combined in less steps, depending on the embodiments of the present disclosure. Further, some steps may be omitted and the order of steps may be changed, if necessary. Further, the matters of FIGS. 1 to 3C and the matters of the method for transmitting and receiving video based on wireless transmission of FIG. 4 may be applied to each other for even other omitted matters.

The method for transmitting and receiving video based on wireless transmission according to an embodiment of the present disclosure described above may be implemented and stored in a medium as a program (or application) to be combined with and executed in a computer that is hardware.

The program described above may include codes that are coded into compute languages such as C, C++, JAVA, JavaScript, Ruby, Python, and a machine language that a processor (CPU) of the computer can read out through a device interface of the computer in order to execute the methods that are implemented as programs by the computer reading out programs. Such codes may include functional codes related to a function defining functions required for executing the methods, and include execution procedure-related control codes that are required for the processor of the computer to execute the functions in accordance with a predetermined procedure. Further, such codes may further include memory reference-related codes about what position (number of address) additional information or media, which are required for the processor of the computer to execute the functions, should be referred to in the computer or an external memory. Further, when the processor of the computer needs to communicate with another remote computer or server to execute the functions, codes may further include communication-related codes about how the communication module of the computer should communicate with what remote other computers or servers and about what information or media the communication module should transmit and receive in communication.

The storage medium means a medium that semipermanently stores data and may be read by a device, rather than a medium that stores data for a short moment such as a register, a cache and a memory. In detail, the storage medium, for example, may be a ROM, a RAM, a CD-ROM, a magnetic tape, a floppy disc, an optical data storage device, etc., but is not limited thereto. That is, the program may be stored in various recording media on various servers that the computer can connect or various recording media on the computer of a user. Further, the media may be distributed to computer systems connected through a network, and may store computer-readable codes in a distribution method.

The above description is provided as an exemplary embodiment of the present disclosure and it should be understood that the present disclosure may be easily modified in other specific ways without changing the technical spirit or the necessary features of the present disclosure by those skilled in the art. Therefore, the embodiments described above are only examples and should not be construed as being limitative in all respects. For example, each component described as a single form may be implemented in a distributed manner, and similarly, components described as being distributed may also be implemented in a combined form.

The scope of the present disclosure is defined by the following claims rather than the above detailed description, and all of changes and modifications derived from the meaning and scope of claims and equivalent concepts should be construed as being included in the scope of the present disclosure.

What is claimed is:

1. A method for transmitting and receiving video based on wireless transmission in a reception device, the method comprising:
   receiving video frames that are wirelessly transmitted from a transmission device using a predetermined frequency band;
   detecting an error in at least one video frame of the received video frames; and
   correcting the error in the at least one video frame with the detected error (hereafter, error video frame) by inputting the error video frame, together with a previous video frame, into a pre-trained artificial intelligence (AI) model,
   wherein the detecting an error in the at least one video frame comprises:
      monitoring a bit error rate of network environment of the wireless transmission; and
      determining that a video frame includes an error when the bit error rate exceeds a preset threshold value, and
   wherein the correcting of the error in the error video frame comprises:
      requesting the transmission device to temporarily store a plurality of video frames from a point in time at which the error was detected;
      requesting the transmission device to transmit the plurality of temporarily stored video frames and a current video frame at a point in time at which the bit error rate becomes less than or equal to the preset threshold value; and
      sequentially playing the plurality of temporarily stored video frames and the current video frame.

2. The method of claim 1, wherein the correcting of the error of the error video frame comprises:
   generating an error generation region in the error video frame as lost information;
   generating correction information from a region corresponding to the lost information in the previous video frame; and
   correcting the region corresponding to the lost information in the error video frame on the basis of the correction information.

3. The method of claim 2, wherein the generating of correction information from a region corresponding to the lost information in the previous video frame comprises:
   identifying an object region and a background region that correspond to the lost information of a plurality of previous video frames; and
   generating position information of each of the object region and the background region and the amount of variation of the position information as the correction information.

4. The method of claim 2, wherein the generating of correction information from a region corresponding to the lost information in the previous video frame comprises: when receiving a plurality of error video frames,
   identifying an object region and a background region that correspond to the lost information in each of a previous video frame received before the plurality of error video frames and a current video frame received after the plurality of error video frames; and
   generating each position information of an object region and a background region in the previous video frame and the current video frame, and the amount of variation of the position information as the correction information.

5. The method of claim 2, wherein the correcting of the error of the error video frame comprises: when correcting a second error video frame after the correction of a first error video frame is completed,
   calculating similarity of lost information between the first error video frame and the second error video frame; and
   applying correction information of the first error video frame to the second error video frame when the similarity of lost information is greater than or equal to a preset threshold value.

6. The method of claim 2, wherein the correcting of the error of the error video frame comprises: when correcting a second error video frame after the correction of a first error video frame is completed,
calculating similarity of lost information between the first error video frame and the second error video frame;
discriminating a coincident part and a non-coincident part of error generation regions of the first error video frame and the second error video frame when the similarity of lost information is less than the preset threshold value;
applying first correction information of the first error video frame to the second error video frame for the coincident part; and
generating second correction information for the second error video frame for the non-coincident part.

7. The method of claim 1, wherein the correcting of the error of the error video frame is to apply the currently trained AI model to a next unit period when a correction ratio calculated between the error video frame and the corrected video frame is greater than or equal to a preset minimum correction ratio.

8. The method of claim 1, further comprising:
retraining the AI model when a correction ratio calculated between the error video frame and the corrected video frame is less than a preset minimum correction ratio; and
applying the retrained AI model to a next unit period.

9. A reception device, comprising:
a communication module receiving video frames that are wirelessly transmitted from a transmission device using a predetermined frequency band;
a memory storing a program for detecting and correcting an error of at least one video frame of the received video frames; and
a processor correcting the error of the video frame with the detected error (hereafter, error video frame) by inputting the error video frame into a pre-trained AI model together with a previous video frame as the program stored in the memory is executed,
wherein the processor monitors a bit error rate for the wirelessly transmitted network environment and detects the bit error rate as an error of the video frame when the bit error rate is detected as exceeding a preset threshold value,
wherein the processor requests the transmission device to temporarily store a plurality of video frames from a point in time at which the error was detected, requests the transmission device to transmit the plurality of temporarily stored video frames and a current video frame at a point in time at which the bit error rate becomes less than or equal to the preset threshold value, and then sequentially plays the plurality of temporarily stored video frames and the current video frame.

10. The reception device of claim 9, wherein the processor generates an error generation region in the error video frame as lost information, generates correction information from a region corresponding to the lost information in the previous video frame, and corrects the region corresponding to the lost information in the error video frame on the basis of the correction information.

11. The reception device of claim 10, wherein the processor identifies an object region and a background region that correspond to the lost information of a plurality of previous video frames, and generates position information of each of the object region and the background region and the amount of variation of the position information as the correction information.

12. The reception device of claim 10, wherein when receiving a plurality of error video frames, the processor identifies an object region and a background region that correspond to the lost information in each of a previous video frame received before the plurality of error video frames and a current video frame received after the plurality of error video frames, and generates each position information of an object region and a background region in the previous video frame and the current video frame, and the amount of variation of the position information as the correction information.

13. The reception device of claim 10, wherein when correcting a second error video frame after the correction of a first error video frame is completed, the processor calculates similarity of lost information between the first error video frame and the second error video frame, and applies correction information of the first error video frame to the second error video frame when the similarity of lost information is greater than or equal to a preset threshold value.

14. The reception device of claim 9, wherein when correcting a second error video frame after the correction of a first error video frame is completed, the processor calculates similarity of lost information between the first error video frame and the second error video frame, discriminates a coincident part and a non-coincident part of error generation regions of the first error video frame and the second error video frame when the similarity of lost information is less than the preset threshold value, applies first correction information of the first error video frame to the second error video frame for the coincident part, and generates second correction information for the second error video frame for the non-coincident part.

* * * * *